United States Patent

[11] 3,619,580

[72] Inventors Roy Thurston Swale, deceased
 late of London, England;
 Edwin Jack Barber, executor, Haslemere, England
[21] Appl. No. 878,070
[22] Filed Nov. 19, 1969
[45] Patented Nov. 9, 1971
[73] Assignee Deca Limited
 London, England
[32] Priority Dec. 3, 1968
[33] Great Britain
[31] 57,292/68

[54] NAVIGATION AIDS
 7 Claims, 1 Drawing Fig.
[52] U.S. Cl. .................................................. 235/150.27,
 235/150.26, 73/178
[51] Int. Cl. ...................................................... G06f 15/50
[50] Field of Search ........................................ 235/150.27,
 186, 150.26; 73/178

[56] References Cited
UNITED STATES PATENTS
3,028,078  4/1962  De George et al. ............. 235/150.27 X
3,007,338  11/1961  Gray et al. ...................... 235/150.27 X
3,114,912  12/1963  Tooley ........................... 235/150.27 X
3,453,624  7/1969  Rockey .......................... 235/150.27 X
3,501,758  3/1970  James et al. ................... 235/186 X Primary Examiner—Malcolm A. Morrison
Assistant Examiner—Edward J. Wise
Attorney—Mawhinney & Mawhinney ABSTRACT: A navigational aid including a position display device driveable to indicate orthogonal position coordinates of an aircraft in response to received pulses from a resolver fed by a transducer that responds to air speed. For each coordinate direction a bidirectional counter stores an estimated component of wind velocity and controls by a diode matrix the feeding to drive means for the display of additional pulses at a rate proportional to the component of wind velocity. At the end of an elapsed time pulses are fed to the counters to correct the stored component of wind velocity and a number of pulses proportional to the product of the elapsed time and the correction to a respective counter is fed to the drive means for correcting each indicated coordinate. Thus the stored components of wind velocity are accurately adjusted automatically by correcting the indicated coordinates.

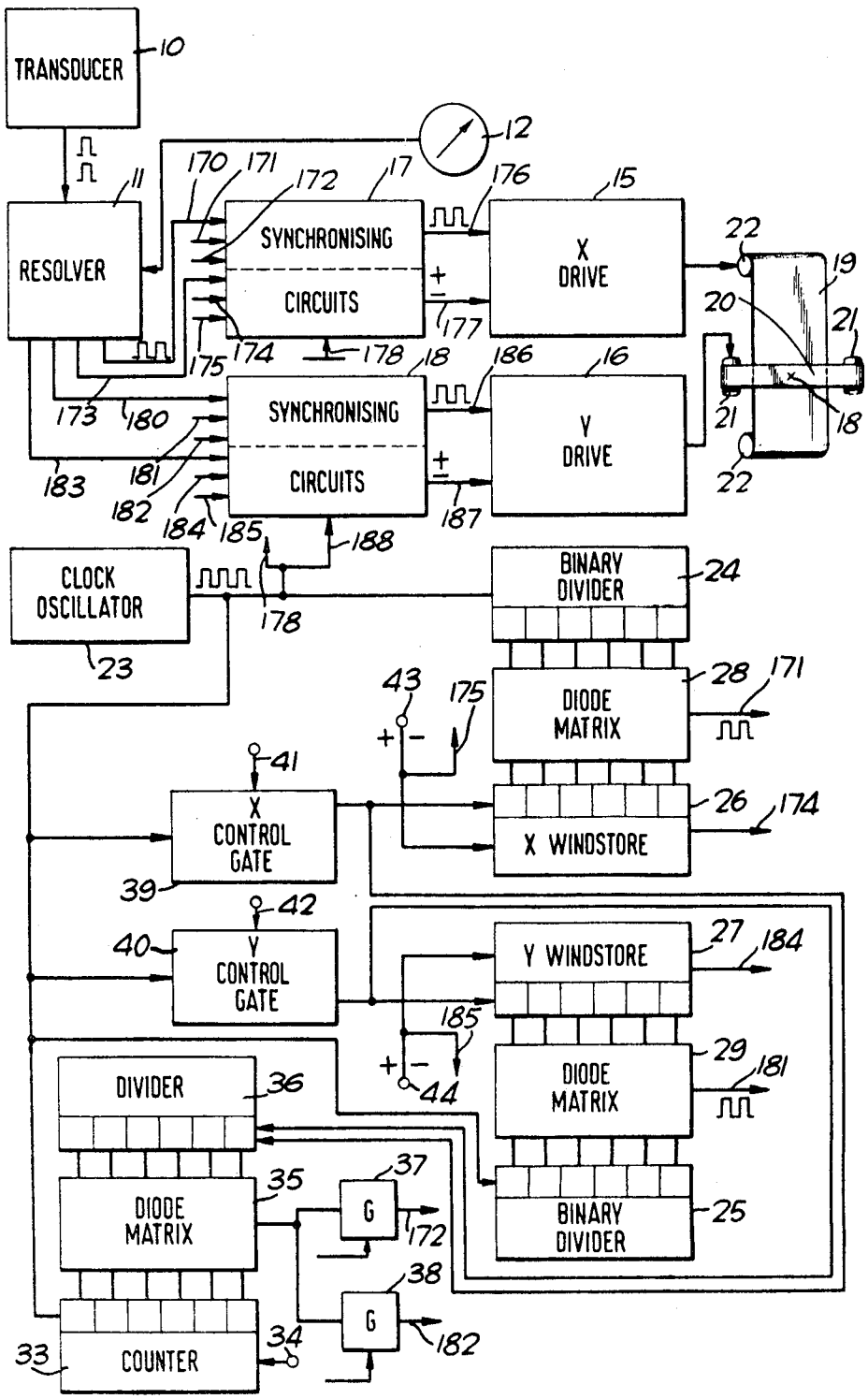

NAVIGATION AIDS

FIELD OF THE INVENTION

This invention relates to navigational aids of the kind which include a display device driveable to indicate in two coordinate directions a position of an aircraft.

BACKGROUND TO THE INVENTION

There exists a number of sophisticated aids from which is is possible to derive positional information which can be used to drive a display device in the form mentioned above. Doppler navigation apparatus is one example. However, the present invention is concerned with devices in which the indication of position is principally determined by the airspeed of the aircraft, that is to say the velocity of the craft through the air. An indication of the airspeed of an aircraft can be obtained in a number of relatively simple and reliable ways. From a knowledge of the heading of the craft it is possible to resolve indications of its air speed into components in two orthogonal coordinate directions and drive the display device in accord with the component, in the respective coordinate direction of the airspeed of the aircraft.

Because the velocity of the aircraft through the air is not normally the velocity of the craft over the surface of the earth, either in magnitude or direction, it is appropriate to alter the rate at which the display is driven in the two coordinate directions in accord with the components of a wind velocity. The altered rates of change of indication ought to result in a correct indication of position by the display device, provided of course that the display device was initially set correctly.

It is of course possible to obtain information regarding the speed and direction of the wind from a meteorological forecast and to set appropriate controls for altering the various rates of change of the indication of position automatically. However, a meteorological forecast may not have been correct, weather conditions can alter and the flight of the aircraft can take the aircraft out of the area for which the meteorological forecast was reasonably correct. The present invention is particularly directed to the alleviation of the problems where a predicted wind velocity is for one reason or another insufficiently accurate.

SUMMARY OF THE INVENTION

According to the invention, a navigational aid comprises a display device driveable to indicate in two orthogonal coordinate directions the position of an aircraft, a timing means and for each of the two coordinate directions, a drive means for driving the display at a rate which accords with the component, in that direction, of the velocity of the aircraft through the air, means for altering said rate in accord with a stored component of a wind velocity, means for adjusting the indicated position of the craft, means automatically operable in conjunction with the adjusting means to adjust the stored component of wind velocity, and control means controlled by the timing means to control the magnitude of the adjustment to the indicated position and the stored component so that the adjustment to the indicated position accords with the product of the adjustment to the stored component and an elapsed time determined by the timing means.

With the present invention it is envisaged that at appropriate times during the flight of the aircraft a comparison be made between the indicated position of the aircraft and the actual position of the aircraft. This might be done by simple observation in some circumstances where the aircraft were flying over a well-charted land mark. Alternatively however use could be made of other navigational aids carried by the aircrafts. For example, the aircraft may include a receiver for the signals of a phase comparison radio navigation system. A position fix obtained using the receiver may be in the form of signals denoting respective coordinate directions the position of the mobile craft: these may be compared with the indicated position. It would be possible to alter the indication of the display device using such signals automatically.

It would be seen that, assuming that the navigational aid works correctly to drive the display device in accord with the velocity of the aircraft through the air, any adjustment made to the displayed position is proportional to the error in the wind velocity and the time for which the error is present. Accordingly by controlling the adjustments so that the adjustment (for each coordinate) to the indicated position is proportional to the product of the time elapsing from a previous adjustment and the adjustment necessary to correct the respective stored wind component the two adjustments can be accurately made merely by adjusting the indicated position. The stored component of wind velocity is thereby up-dated to a correct value at the time of adjustment.

The timing means would normally be resettable to permit several adjustments during a flight at selectable intervals.

It is preferred that a bidirectional counter is used for storing each component of wind velocity. This is particularly convenient where the display is driveable by means of pulses each representing increments of distance. Accordingly the means for driving the display device may comprise means for feeding to the drive means pulses each representing a unit of distance. In this form of the invention, the means for altering the said rate may comprise means for combining the said pulses with additional pulses representing like units of distance; the rates of the pulses and additional pulses would be in accord with the respective components of the airspeed of the craft and the wind velocity.

In a preferred form of the invention, there is provided a source of clock pulses, resettable means for counting the clock pulses, a divider under the control of the resettable means for counting, and for each of the said coordinate directions a store for storing the magnitude and sense of a respective component of wind velocity, divider means under the control of the store operative on receipt of clock pulses to feed to the drive means pulses at a rate representing the respective component of wind velocity and controllable gating means operative to feed pulses both to alter the stored component and to the divider that is under the control of the resettable means; the divider being arranged and controlled to provide, in response to received pulses, pulses for the adjustment of the indicated position by the respective drive means.

The display device may comprise a chart and two drive means for effecting relative displacement of the chart and an index in a respective one of two coordinate directions and preferably the chart is in the form of an elongate strip moveable longitudinally and the index is moveable transverse the chart whereby the cooperation of the chart and the index indicates the desired position; but other forms of display device may be used.

DESCRIPTION OF THE DRAWING

The single FIGURE is a schematic diagram of the preferred embodiment of the invention.

DESCRIPTION OF THE PREFERRED EMBODIMENT

Pulses from a transducer 10 are fed at a rate proportional to the airspeed of an aircraft to a resolver 11 which is set in accord with a compass 12 and which, for each input pulse, provides on lines 170 and 180 a number of pulses proportional respectively to the sine and cosine of the compass heading, or that heading plus or minus a fixed angle. The pulses represent increments of distance travelled through the air in two cartesian coordinate directions (called hereinafter X and Y).

It will be appreciated that the embodiment so far described is conventional. The transducer 10 may be of any suitable type responsive to airspeed. A turbine having cooperating magnet and coil mounted on a rotor and a stator respectively is preferred. The resolver 11 may be of any known form. Apart from the output pulses, the resolver provides on respective lines 173 and 183 in any known manner direct signals of which the senses denote the signs of the sine and cosine of the heading. This enables the conventional X and Y drives 15 and 16 to distinguish the direction of the movement represented in magnitude by the respective output pulses of the resolver; the drives 15 and 16 receive these latter signals via lines 177 and 187 respectively.

The drives 15 and 16 receive the various respective output signals of the resolver via synchronizing circuits 17 and 18 (whose purpose will be explained hereinafter) and lines 176 and 186; the drives 16 and 15 drive respectively an index 18 and a chart 19 longitudinally. The index 18 is carried on an endless band 20 mounted on rollers 21 coupled to the drive 16 and the chart is carried between rollers 22 likewise coupled to the drive 15. This type of display device, with the index and chart driven in cartesian coordinate directions, is well known *per se* and need not be described in detail.

Additionally to the pulses from the resolver 11, the X and Y drives are fed with pulses at rates proportional to the wind velocity's components in those directions. A clock oscillator 23 produces pulses at a predetermined, regular rate corresponding to a velocity that is at least as high as the maximum expected wind velocity. The oscillators pulses are fed to two binary dividers 24 and 25. These are conventionally constructed, the $n^{th}$ stage of each divider providing a single pulse output for every $2^n$ pulses received by the divider. Two "wind stores" 26 and 27 are provided, one associated with each binary divider. Each wind store is a bidirectional binary counter which stores a binary digital signal proportional to the wind velocity's component in the respective coordinate direction. The stages of each wind store control the outputs of the associated divider by means of a conventional diode matrix (28 and 29 respectively) so that pulses are fed out from each matrix on lines 171 and 181 respectively at a rate proportional to wind velocity in the respective direction. Each wind store also provides, in conventional manner a direct signal (on lines 174 and 184 respectively) denoting the sign of the stored value of wind velocity relative to the coordinate system of the display device.

In normal operation, pulses from the resolver and the wind stores drive the X and Y drives so that the displayed position is altered in accord with the components of both the airspeed of the aircraft and the wind velocity. If the stored value of a component of wind velocity is incorrect, the displayed position will be incorrect by (for each coordinate) the product of the duration of the error and the average error. At intervals therefore, the display is altered to display the correct position and automatically the stored value of the component of wind velocity is corrected. In order to correct the displayed position, pulses from the clock oscillator 23 are fed to each drive and simultaneously to the respective wind store. Because each pulse represents a unit of distance, the number of pulses required to alter the displayed position will be proportional to the duration of the error and the magnitude thereof.

Pulses from the oscillator are counted by a counter 33 which can be reset by a control 34. The stages of the counter control by means of a diode matrix 35 the outputs of a binary divider 36. The output from the matrix 35 leads via control gates 37 and 38 and lines 172 and 182 respectively to the synchronizing circuits 17 and 18 and thence to the X and Y drives respectively.

Outputs from the oscillator 23 lead also to X and Y control gates 39, 40 operable by means of a control 41, 42 respectively. When each control is operated pulses from the oscillator are allowed to pass into the respective wind store and to the divider 36. A respective sense control 43, 44 would be operated simultaneously to feed a direct signal to the respective wind store and via lines 175 and 185 to the respective drive means via the respective synchronizing circuit to ensure that the various corrections are made in the appropriate sense. The two sets of controls 41, 43 and 42, 44 would be interlocked to ensure operation of only one set at a time.

The gates 37 and 38 are opened simultaneously with the control gate 39 and 40 respectively.

The operation of the device is illustrated by the following example. After 1 hour of operation 10 pulses are required to correct the display x coordinate. The controls 41 and 43 are operated causing pulses to pass to the display via the time divider network 33, 35, 36, gate 37 and the synchronizing circuit 17. In this particular example a maximum update time of one hour is incorporated; therefore the time divider network 33, 35 and 36 will have run down to provide a division factor of unity and 10 pulses only will be required at the input of the divider 36. Ten pulses will also be passed into the wind store 26. Should only half an hour have elapsed since the last adjustment and the same error accrued indicating a wind error of twice the previous value, then in order to obtain 10 pulses at the display 20 pulses would be required at the input of the divider 36; the division factor provided by the divider will be 2. It will be seen that 20 pulses are fed to the wind store to correct the component stored therein.

The device's operation as far as the Y coordinate is concerned is similar.

The synchronizing circuits 17, 18 are provided to ensure noncoincident operation of the drives by the various pulses and sense signals. They are controlled by the clock oscillator in a conventional manner, clock pulses being fed to control inputs 178 and 188 of the circuits 17 and 18.

I Claim:

1. A navigational aid comprising a display device driveable to indicate in two orthogonal coordinate directions the position of an aircraft, a timing means and for each of the two coordinate directions, a drive means for driving the display at a rate which accords with the component, in that direction, of the velocity of the aircraft through the air, a store for storing a respective component of wind velocity, means for altering said rate in accord with said stored component of a wind velocity, means for adjusting the indicated position of the craft, means automatically operable in conjunction with the adjusting means to adjust the stored component of wind velocity, and control means controlled by the timing means to control the magnitude of the adjustment to the indicated position and the stored component so that the adjustment to the indicated position accords with the product of the adjustment to the stored component on an elapsed time determined by the timing means.

2. A navigational aid as claimed in claim 1 in which the timing means is resettable.

3. A navigational aid as claimed in claim 1 in which the means for driving the display device comprises means for feeding to the drive means pulses each representing a unit of distance and in which the means for altering the said rate comprises means for combining the said pulses with additional pulses each representing units of distance.

4. A navigational aid as claimed in claim 3, in which there are provided a source of clock pulses, resettable means for counting the clock pulses, a divider under the control of the resettable means for counting, and, for each of the said coordinate directions, divider means under the control of the respective store operative on receipt of clock pulses to feed to the drive means pulses at a rate representing the respective component of wind velocity and controllable gating means operative to feed pulses both to alter the stored component and to the divider that is under the control of the resettable means; the divider being controlled by said resettable means to provide a division factor decreasing with time, and said divider being responsive to received pulses, to provide a quotient of pulses for the adjustment of the indicated position by the respective drive means.

5. A navigational aid as claimed in claim 4, in which the display device comprises a chart and two drive means for effecting relative displacement of the chart and an index in a respective one of two coordinate directions, and in which the chart is in the form of an elongate strip moveable longitudinally and the index is moveable transverse the charts.

6. A navigational aid as claimed in claim 4 in which each store comprises a bidirectional counter.

7. A navigational aid as claimed in claim 6 in which each divider means for each coordinate direction each comprises a binary divider having a plurality of stages coupled to output means through a diode matrix under the control of the respective bidirectional counter.

* * * * *